Patented Apr. 29, 1947

2,419,755

UNITED STATES PATENT OFFICE 2,419,755

CHEMICAL TREATMENT OF OIL SANDS

Frederick W. Albaugh, Inglewood, Calif., assignor to Union Oil Company of California, Los Angeles, Calif., a corporation of California No Drawing. Application May 26, 1943, Serial No. 488,524

12 Claims. (Cl. 252—8.55)

This invention deals with a process for improving the productivity of oil wells, and especially with a method of chemical treatment of the sand adjacent to the well bore whereby its permeability to oil is increased and its permeability to water is decreased.

It is commonly accepted that the rate of petroleum production from a given well is limited by the degree of water saturation in the sands immediately surrounding the well. This is in keeping with the concept that in the multiphase flow of fluids through a permeable sand, the permeability to a particular fluid varies directly with the percent saturation of that fluid in the sand pores. It follows that a process for reducing the water saturation and increasing the oil saturation of the sands adjacent to the well bore, as this invention comprises, performs a concomitant function of increasing oil well productivity.

I have discovered a process whereby by treating a producing oil sand with chemicals hereinafter disclosed, I can obtain improved results with regard to oil and gas flow into the well from the formation. Situations in which the present invention would be useful are as follows: (1) A well producing both oil and water would after treatment, and at a given pressure gradient, produce a higher ratio of oil to water, thereby decreasing pumping costs as well as normally increasing oil productivity. (2) If in the drilling and completion of a new well adverse conditions or faulty mud control allow excessive amounts of water to penetrate the formation, an abnormally low productivity may ensue due to the blocking action of the water. The invention herein proposed would, through removal of the excess water, correct this abnormal condition. (3) In a new well completed without appreciable mud filtrate penetration and producing no water, the normal productivity may be improved upon. The present process is capable of effecting this improvement by reducing the interstitial water saturation existing around the well bore to a value even lower than the connate water saturation of the untapped formation.

The specific function of the chemical treatment of this invention is the alteration of the wetting properties of a hydrophilic or water-wet sand whereby the sand surfaces are rendered more wettable by oil than by water. It is considered that this process involves chemi-sorption, or chemical adsorption of the chemical agent at the solid-liquid interfaces without corrosion or solution of the solid. It is generally accepted that if such a surface alteration is imposed upon a sand saturated with at least two fluids, such as oil and water, the sand pores will upon the beginning or the resumption of flow, undergo a change in fluid saturations. The change will be in the direction of increased oil saturation and decreased water saturation, inasmuch as the surface alteration increases the adhesion between sand and oil while decreasing that between sand and water. The altered fluid saturations produce the desired changes in water and oil permeabilities and flow rates as already indicated.

It has now been observed that the above beneficial effects of altered wetting properties and reduced water saturations may be achieved to a considerable degree by contacting the water-wet sands with an organic amine which is preferably slightly soluble in water, i. e., about 1% to about 9%, and does not have excessive surface activity at the water-oil interface. These amines in general contain preferably about 8 to about 12 carbon atoms. Examples are heterocyclic, polycyclic unsaturated amines such as quinoline, homologs, isomers, and mixtures thereof; and mixtures such as the nitrogen bases extractable with dilute acid from petroleum, shale, or coal tar fractions which may or may not have been subjected to pyrolysis. Of these the heterocyclics, especially quinoline and the nitrogen base extracts, especially those of low molecular weight, are preferred.

In some instances the amines may also be employed in the form of their acid salts, such as quinoline hydrochloride, and the like. The solution should not contain an excess of free acid however, such as would be used in acid treatment of oil-bearing formations.

In the use of the above amines to treat the oil sands, the amines are preferably dissolved in a solvent which may be either aqueous or hydrocarbon, or highly soluble in both water and oil, such as dioxane, ethyl alcohol, or acetone, and the like. The aqueous solutions have the advantage of being miscible with the water in the oil sands and therefore affording ready access of the amine to the solid-water interface, and the oil solutions have the advantage of greater capacity to dissolve many of the amines. The oil solutions are generally preferred for treating the sands surrounding new wells. The concentration of the amine in the solution is preferably above about 1%, and may be very high, up to 100%. Concentrations lower than 1% may also be employed especially with aqueous solutions.

In carrying out the treatment of the invention, the amine or amine solution as described above, is charged to the well bore so as to contact the producing sands, and sufficient pressure is applied to force the treating solution into the producing sands immediately surrounding the well bore. After allowing a suitable time, such as a day or more, for diffusion of the solution into the sands and chemi-sorption of the amine at the solid-fluid interface, the pressure is released, the remaining solution is withdrawn and the production of oil through the treated sands and the same well bore, is carried on. The water liberated from the sands by the treatment may cause an initial high ratio of water to oil in the production, but the succeeding normal production of the well will exhibit a lower ratio of water to oil than would be obtained without the treatment. The treatment may be repeated if desired. Also the sands may be flushed with a mutual solvent for oil and water, such as acetone, after the amine treatment and before production, to facilitate the removal of the water displaced from the sand by the treatment.

As an explanation of the effectiveness of the amines in improving oil flow, it seems likely that the surfaces of the siliceous sand which may be somewhat acidic in nature tend to adsorb the amine which is of alkaline nature, by a type of chemi-sorption which is sufficiently strong in many instances to actually displace the water, and make the sand preferentially oil-wet. The water may then be flushed from the sand by incoming oil, and thereafter the flow of oil through the sand may be less restricted, while the flow of interstitial water may be more restricted. The treatment differs from treatment of sands with ordinary surface-active or surface tension reducing agents such as soaps for example, since an ordinary surface-active agent although it may affect the fluid-solid interface to a small degree, is predominantly effective on the oil-water interface. The latter effect may cause emulsions which could actually tend to plug the formations and restrict oil flow by Jamin action. The amines which I prefer to employ on the other hand, selectively affect the fluid-solid interface by chemi-sorption on the solid, and do not primarily affect the oil-water interface or causes emulsions. Chemi-sorption may be defined as a reaction in which the adsorbate, such as quinoline for example in this case, is bound to the adsorbent, such as silica, through the formation of a covalent chemical bond. Such a definition of chemi-sorption is given on page 252 of a textbook by Adam, entitled "The Physics and Chemistry of Surfaces," 3d edition, published in 1941 by the Oxford Press of London. This may proceed in the present example through the formation of a quinoline-substituted ammonium ion bound by ionic forces to a silicic acid radical, but it is clear that such chemi-sorption results in a very stable bond between the compounds employed in this invention and the surfaces of the producing sands. Although this is a possible explanation of the effectiveness of the treatment, the invention is not to be limited thereby.

As a specific example of the effect of amines in improving the permeabiilty of oil sands, a core sample of a typical siliceous producing oil sand from the Coles Levee district in California, was cleaned thoroughly by washing it with carbon tetrachloride and acetone successively until no further oil or water could be extracted. After being dried, the clean core was found to be preferentially water wet. It was then completely saturated with salt water and typical refined kerosene was passed through the core under a constant pressure gradient of about 23 pounds per square inch per foot of core length, and a constant temperature of about 80° F., until the flow rate of the kerosene through the core became constant at about 2.6 ml. per hour. This operation was then continued unchanged while the kerosene stock was modified by the addition of 2% of quinoline. The kerosene flow immediately showed an increase, and soon attained a constant rate of about 5.0 ml. per hour, about double its original rate. Tests showed that the surface tension of the kerosene was unchanged by the treatment, being 27 dynes before the addition, and 27 dynes after the addition of the 2% of quinoline.

The amines employed in the process of this invention are most effectively chemi-sorbed on silica which is the predominating constituent of the ordinary siliceous oil sands. There are many producing formations, however, which are predominantly calcareous, and somewhat alkaline in reaction, and it is preferable in some instances to treat these formations with an organic material of somewhat acidic nature in order to promote chemi-sorption. The added material should have more than about 6 carbon atoms, and may comprise for example, naphthenic acids, especially those derived from petroleum fractions.

Modifications of the process of this invention which would occur to one skilled in the art are included in the scope of the following claims.

I claim:

1. A method of treating water-wet oil sands for increasing their effective permeability to oil which comprises contacting said sands with hydrocarbon oil solution of an organic heterocyclic polycyclic amine of the class consisting of quinoline and its homologs, which does not substantially affect the water-oil interfacial tension.

2. A method for increasing the effective permeability of water-wet oil sands immediately surrounding an oil well which comprises forcing a hydrocarbon oil solution of an heterocyclic polycyclic amine of the class consisting of quinoline and its homologs which does not substantially affect the water-oil interfacial tension through said well into the said oil sands, withdrawing said solution through said well, and immediately thereafter producing the well.

3. A method according to claim 2 in which the sands are siliceous sands.

4. A method for increasing the ratio of oil to water in the production of an oil well which comprises injecting a hydrocarbon oil solution of an heterocyclic polycyclic amine of the class consisting of quinoline and its homologs which does not substantially affect the water-oil interfacial tension into said well so as to contact the surrounding sands with said solution, allowing a sufficient time of contact to permit chemi-sorption of the heterocyclic polycyclic amine at the fluid-sand interface and immediately thereafter producing the well.

5. A method for decreasing the water saturation of water-wet oil sands surrounding a well bore which comprises contacting said sands with a hydrocarbon oil solution of an heterocyclic polycyclic amine of the class consisting of quinoline and its homologs which does not substantially affect the water-oil interfacial tension injected through said well bore, allowing a sufficient time of contact to permit chemi-sorption of the heterocyclic polycyclic amine at the fluid-sand interface, and withdrawing the remaining solution together with water dispersed from the oil sands through said well bore.

6. A method according to claim 2 in which the amine is contained in a mixture of nitrogen bases obtained from hydrocarbon oils of the class consisting of petroleum, shale and coal tar fractions.

7. A method according to claim 2 in which the heterocyclic polycyclic amine is quinoline.

8. A method for reducing the water saturation of water-wet oil sands which comprises treating said sands with an oil solution containing an organic heterocyclic polycyclic amine of the class consisting of quinoline and its homologs which does not substantially affect the water-oil interfacial tension, and subsequently contacting the treated sands with a mutual solvent for oil and water.

9. A method of increasing the productivity of oil wells which comprises introducing into the well an oil solution containing approximately 2% of an organic heterocyclic polycyclic amine of the class consisting of quinoline and its homologs, which does not substantially affect the water-oil interfacial tension, forcing said solution into the interstices of the formation to contact water wetted sands and thereby altering the wetting properties of said sands to render them wettable by oil, subsequently withdrawing said solution together with water from said formation and directly thereafter producing said well.

10. A method according to claim 2 in which the organic heterocyclic polycyclic amine has fewer than about 12 carbon atoms.

11. A method of increasing the productivity of oil wells which comprises introducing into the well an oil solution containing approximately 2% of quinoline, forcing said solution into the interstices of the formation to contact water wetted sands and thereby altering the wetting properties of said sands to render them wettable by oil, subsequently withdrawing said solution together with water from said formation and directly thereafter producing said well.

12. A method according to claim 1 in which the solution contains about 2% of the amine.

FREDERICK W. ALBAUGH.

REFERENCES CITED

The following references are of record in the file of this patent:

UNITED STATES PATENTS

| Number | Name | Date |
|---|---|---|
| 2,262,428 | Lietz | Nov. 11, 1941 |
| 2,267,548 | Berl | Dec. 23, 1941 |
| 2,327,017 | Chamberlain | Aug. 17, 1943 |
| 2,331,594 | Blair | Oct. 12, 1943 |
| 2,053,616 | Landolt | Sept. 8, 1936 |
| 2,356,205 | Blair et al. | Aug. 22, 1944 |
| 2,356,254 | Lehmann et al. | Aug. 22, 1944 |

OTHER REFERENCES

Plummer et al., Water Cones and Water Sheaths in Experimental Oil Wells. Article in Bulletin of the American Association of Petroleum Geologists, vol. 24, No. 12; pp. 2163–2179, December 1940.

Certificate of Correction

Patent No. 2,419,755. April 29, 1947.

FREDERICK W. ALBAUGH

It is hereby certified that errors appear in the printed specification of the above numbered patent requiring correction as follows: Column 4, line 35, after "with" insert the article *a*; column 5, line 1, claim 5, for "dispersed" read *displaced*; and that the said Letters Patent should be read with these corrections therein that the same may conform to the record of the case in the Patent Office.

Signed and sealed this 29th day of July, A. D. 1947.

[SEAL]

LESLIE FRAZER,
*First Assistant Commissioner of Patents.*